Oct. 17, 1933.    A. M. NICOLSON    1,930,905
PIEZO-ELECTRIC APPARATUS
Original Filed Jan. 8, 1924
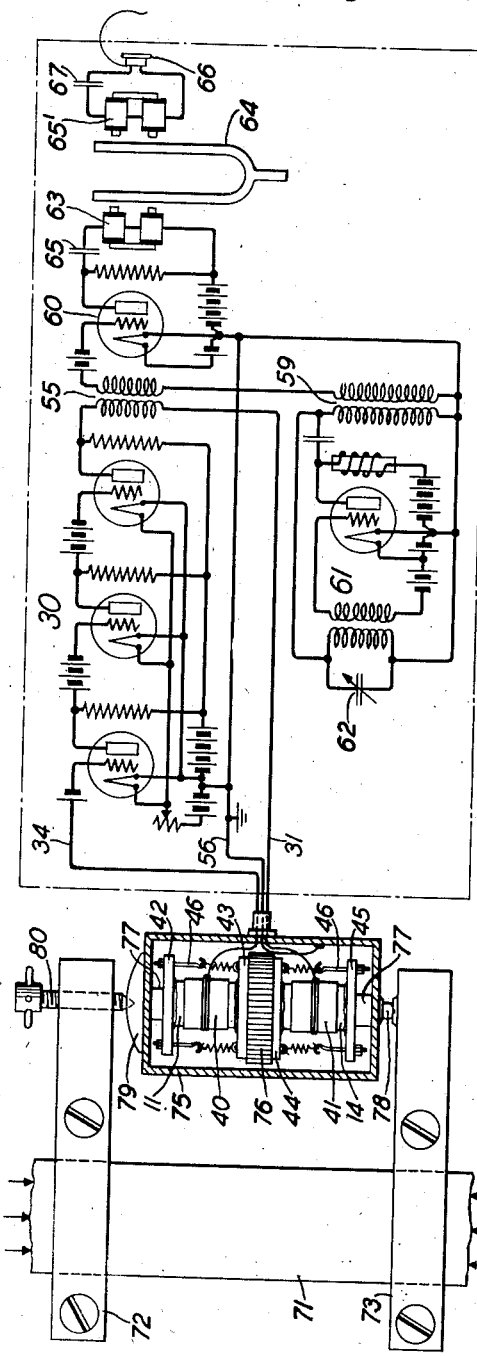
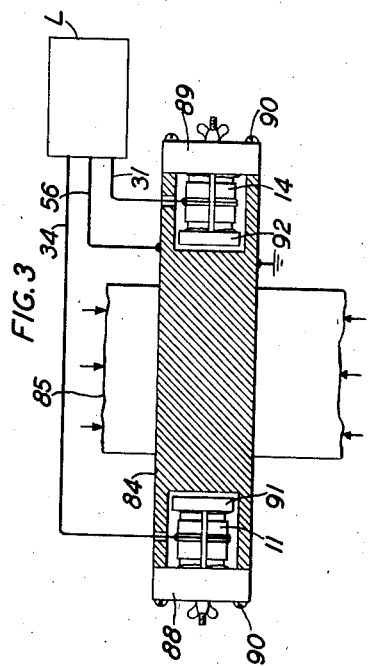
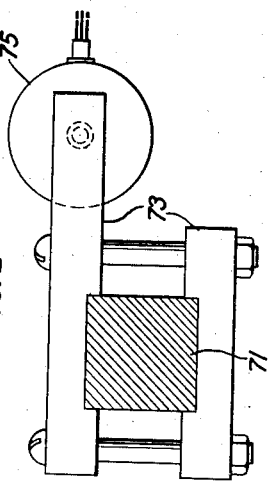
INVENTOR
*A. M. NICOLSON*
BY E. V. Griggs
ATTORNEY Patented Oct. 17, 1933

1,930,905

UNITED STATES PATENT OFFICE 1,930,905

PIEZO-ELECTRIC APPARATUS

Alexander M. Nicolson, New York, N. Y., assignor to Western Electric Company, Incorporated, New York, N. Y., a corporation of New York Original application January 8, 1924, Serial No. 685,010. Divided and this application October 31, 1931. Serial No. 572,303

8 Claims. (Cl. 171—327)

This invention relates to piezo-electric apparatus and more particularly to mountings for piezo-electric devices to render such devices more stable under conditions of varying atmospheric pressure and temperature.

The resonance characteristics of a piezo-electric crystal are to an extent dependent on its physical environment and among other things upon the pressure and temperature conditions to which it is subjected. According to this invention, the piezo-electric crystal is mounted within a hermetically sealed container in such manner that desired electrical and mechanical forces may be impressed upon it while the normal conditions of the atmospheric pressure and temperature within the container are maintained substantially independent of and unaffected by variations in the pressure and temperature of the external atmosphere about said container.

An additional feature of the invention is an oscillator of the electron discharge tube type, the frequency of which is determined by a hermetically sealed piezo-electric crystal thus assuring that the oscillation frequency will be substantially unaffected by variations in atmospheric conditions such as changes in atmospheric temperature and pressure.

The novel features which are characteristic of the invention are set forth with particularity in the appended claims. The invention itself, however, both as to its organization and method of operation, together with further objects and advantages thereof, will best be understood by reference to the following description taken in connection with the accompanying drawing in which;

Fig. 1 shows diagrammatically a stress measuring system employing an electron discharge oscillator constructed according to this invention;

Fig. 2 is a plan view of the apparatus at the left of Fig. 1; and

Fig. 3 illustrates a modified system for measuring compressional forces.

In Figs. 1 and 2, a member 71, which may be, for instance, a strut in a building structure, truss or the like, (not shown), is in compression in the direction indicated by the arrows. Where it is desired to know whether the stress changes over a period of time, as for instance, over a period during which there is reason to expect that such a change may occur due to settling of some part of the structure, a clamp 72 and a clamp 73, or the like, may be rigidly attached to the member 71, as indicated in the drawing, at the beginning of the period, and there may be mounted between the clamps a casing 75 containing two piezo-electric crystals 11 and 14. Each of these crystals has a girdle electrode and an electrode of sign opposite to that of the girdle electrode at each basal plane of the crystal, after the fashion of the girdle electrodes and basal plane electrodes of the crystal in Fig. 12 of an article entitled "The Piezo-Electric Effect in the Composite Rochelle Salt Crystal", Proceedings of the American Institute of Electrical Engineers, November, 1919, page 1315. The girdle electrode of crystal 11 is shown at 40 in Fig. 1, and the girdle electrode of crystal 14 is shown at 41. The electrodes at the top and bottom basal planes of crystal 11 are shown at 42 and 43, respectively, and the electrodes at the top and bottom basal planes of the crystal 14 are shown at 44 and 45, respectively. The ends of the crystals may be cemented to these basal plane electrodes, as shown, the top and bottom basal plane electrodes for each crystal being electrically connected by springs and connector bolts 46 and 47 forming compressor plates for axially compressing the crystal. A resilient member, for instance, a block such as is shown at 76, may be interposed between the upper compressor plate of crystal 14 and the lower compressor plate of crystal 11. Although the material of block 76 should be elastic, it is preferably more easily deformable than the material of crystals 11 and 14 where, as shown in the drawing, the block is thin in comparison to the length of the crystals. The block may, in such case, be of wood, for example. Blocks 77, interposed between the casing 75 and the upper compressor plate of crystal 11, and between the casing 75 and the lower compressor plate of crystal 14, may be of cast iron, steel or the like, and provide clearance spaces at the end of casing 75 for the nuts used on bolts 46 in assembling the crystals between the compressor plates. Although the casing may be of any suitable material and may be relatively flexible or relatively stiff, it is preferably of metal, such as phosphor-bronze, steel or the like, with considerable rigidity, where the stress in the member 71 is great, so that the crystals will be somewhat relieved of stresses applied to the casing. However, the clamps 72 and 73 and the casing and crystals serve to shunt stress around the part of the strut 71 included between the clamps, and therefore the static force transmitted to the casing and the crystals by the clamps 72 and 73 may be small compared to the stress in the strut 71. Preferably, the mounting of the casing 75 between clamps 72 and 73 is such as to obviate, as far as is practical, the application of any torsional stresses to the casing 75 by clamps 72 and 73. As shown, the casing is provided with a ball bearing 78 between its lower end and clamp 73, and a plate or block 79 on the top of the casing is provided with a recess for receiving the pointed end of a capstan screw 80 or the like, which threads through clamp 72 and affords means for applying any desired degree of pressure to the casing. Leads 34, 31 and 56 are taken out from the casing 75 through an opening which is preferably sealed so that casing 75 will be air-tight and moisture-proof.

An amplifier 30, shown by way of example as of a multi-stage, resistance-coupled electron discharge type, has its output leads 31 and 56 connected to the opposite electrodes, respectively, of one of the crystals. As shown, the plate lead 31 is connected to the girdle electrode of crystal 14 and the filament lead 56 is connected through the casing 75, lower block 77 and bolts 46 and their associated springs to the upper and lower basal plane electrodes 44 and 45 of that crystal. The amplifier 30 has its input leads connected to the electrodes of crystal 11. As shown, the filament lead 56 is connected to the basal plane electrodes through casing 75, upper block 77, bolts 46 and associated springs, and the grid lead 34 is connected to the girdle electrode of that crystal. The interconnections between the amplifier and the crystals should not be so made that the electromotive forces fed into the input of the amplifier will be of such phase as to prevent instead of cause oscillations. That is, E. M. F. variations applied to the input of the amplifier should not, after transmission through the amplifier and the piezoelectric apparatus, return to the input of the amplifier with 180 degrees phase change. By employing resistance coupling with the amplifier rather than reactive couplings, any tendency which the reactances might have to affect the frequency of oscillation is avoided.

If the amplification in amplifier 30 is sufficiently great, the feed-back through the piezo-electric crystal structure will cause the amplifier to generate sustained oscillations and the frequency of the oscillations generated by amplifier 30 at any time will depend upon the compression exerted on the casing 75 and the compression in block 76 at that time. Therefore, if the frequency of the oscillations be measured at the beginning of the above mentioned period during which a change in the compression in member 71 might be expected, and if during the period or subsequent thereto the frequency of oscillation be measured again under the same conditions as regards the temperature of elements 71 to 80, the adjustment of screw 80, etc., a comparison of the two frequencies which are obtained as the results of the measurements will indicate whether the compression in the member 71 has changed.

If the frequency of oscillation be measured for different observed values of compressional forces applied to strut 71 (other conditions, for instance the temperature of the apparatus within the container 75, remaining the same), a curve can be plotted between the compression exerted or the piezo-electric apparatus and the frequency of the oscillations generated by amplifier 30. Any suitable wave meter, frequency meter or other frequency measuring means may be employed in obtaining this curve. The means indicated in the drawing, by way of example, comprise the oscillator 61, the modulator 60, and the fork 64 and receiver 66. For each setting of device 80 condenser 62 may be so adjusted as to cause the beat frequency resulting from the oscillations of amplifier 30 and those of oscillator 61 (when the latter is, say, of higher frequency than the former) to be such that the beat current, delivered by the tube 60, is of the frequency of fork 64 and, therefore, actuates receiver 66.

In the output lead 31 of the amplifier 30 is the primary winding of a transformer 55. The secondary winding of transformer 55 is connected in series with the secondary winding of a transformer 59 in the grid circuit of the modulating and detecting tube 60, the transformer 59 being an output transformer of the electron discharge oscillator 61, which has a feed-back circuit comprising the variable condenser 62 which is so calibrated that the oscillator can be used as a frequency standard of variable frequency.

In the output circuit of tube 60 is an electromagnet 63 for operating a tuning fork 64, the inductance of the magnet cooperating with the capacity of a condenser 65 to form a circuit tuned to the frequency of the fork. When the fork vibrates, it generates an alternating E. M. F. in the winding of a permanent magnet 65', which cooperates with the inductance of a telephone receiver 66 or other detecting means and the capacity of a condenser 67 to form a circuit tuned to the frequency of the E. M. F. generated by the vibration of the fork.

In the operation of the apparatus of Fig. 1, alternating electromotive forces from amplifier 30 applied to electrodes 41 and 44, 45 through leads 31 and 56 cause elastic vibrations of crystal 14 which are communicated to crystal 11 by means of the mechanical coupling between these two crystals. The resulting elastic vibrations of crystal 11 generate alternating electromotive forces across electrodes 40 and 42, 43 and these electromotive forces are applied to the filament and grid of the amplifier 30 through leads 56 and 34. The output of the amplifier thus feeds energy to the input of the amplifier, and when the amplification of this input energy by the amplifier is sufficient, the system oscillates. The frequency of sustained oscillation is determined by the frequency of maximum responsiveness of the resonance frequency, or the frequency of maximum power transmission of the piezo-electric structure. This frequency is in turn dependent upon the natural frequency of vibration (in the mode involved) of the mechanical coupling between crystals 14 and 11 or the frequency of maximum efficiency of mechanical energy transmission of the mechanical coupling between the motor crystal 14 and the generator crystal 11.

Fig. 3 shows how a compressional force on a member 84 may be measured as a function of the torsional rigidity of the member. The force to be measured is applied to block 85 in the direction indicated by the arrows so that the coefficient of rigidity of member 84 is modified for an appreciable part of its volume. Piezo-electric crystals 11 and 14 are provided with girdle electrodes and basal plane electrodes, or compressor plates, connected to the apparatus of block L by leads 34, 31 and 56, after the fashion described in connection with Fig. 1, and are mounted in recesses in the ends of member 84 by rigidly attaching the outer compressor plates 88 and 89, respectively, of the crystals to the ends of the member 84, for instance by means of screws 90. The recesses may thus be air-tight and moisture-proof. The inner compressor plates 91 and 92, respectively, of the crystals, preferably have considerable mass to reflect torsional elastic vibrations of the crystals.

If the amplification in amplifier 30 (not shown) in block L is sufficiently great, the feed-back through the piezo-electric crystal structure including member 84 will cause the amplifier to generate sustained oscillations, the member 84 undergoing torsional elastic vibrations at its frequency of resonance for such mode of vibration, the frequency of the oscillations depending upon the magnitude of the forces applied to block 85. The system may be calibrated in the manner described in connection with Fig. 1 by applying known forces to the block 85 and observing the corresponding frequencies of oscillation.

This application is a division of my prior application, Serial No. 685,010 filed January 8, 1924.

My application, Serial No. 631,859, filed April 13, 1923, claims broadly an amplifier or oscillator with a piezo-electric feed-back connection.

What is claimed is:

1. A piezo-electric device comprising a piezo-active element, a conductive base member on which said element rests and which serves as an electrode, a second electrode in contact with said element, a hermetically sealed container, at least one wall portion of which consists of electrically conducting material, surrounding said element and its electrodes, said base member being supported upon and electrically connected with said wall portion and a conducting lead connected to said second electrode and extending through a seal in said container.

2. A piezo-electric device comprising a plurality of piezo-active elements, means for mechanically coupling said piezo electric elements whereby mechanical vibration of one in response to electrical excitation induces mechanical excitation of the other with consequent generation of corresponding undulating E. M. F.'s, and a hermetically sealed container surrounding said elements whereby the natural frequency characteristics of said elements and the frequency of the undulating E. M. F.'s produced are substantially unaffected by variations in atmospheric conditions.

3. A piezo-electric device comprising a plurality of piezo-active elements, a hermetically sealed container surrounding said elements and excluding moisture therefrom, said elements being mechanically coupled to enable highly selective translation of an E. M. F. imposed upon one element into an E. M. F. generated by the other and to maintain the selective characteristics of said elements substantially free from effects of moisture or other external atmospheric conditions.

4. A piezo-electric device comprising a piezo-active element, upper and lower conducting electrode members associated with opposite parallel faces of said element, a hermetically sealed container surrounding said element and having at least one wall consisting of electrically conductive material, said lower electrode member being supported by and electrically connected to the inner face of said electrically conductive wall, and means whereby said piezo active element is clamped between said electrically conductive wall and said upper electrode, and a resilient means adapted to support said element.

5. A piezo-electric device including a resilient sealed container, a plurality of piezo-active elements mounted in said container, said elements being effectively in engagement with walls of said container, and means for applying forces to said elements through said container.

6. In an electrical system a piezo-electric crystal, a hermetically sealed container within which said crystal is contained comprising a base portion constituting one wall and a detachable cover member fitting thereagainst with a moisture-proof and air-tight seal therebetween whereby during operation said crystal is maintained under conditions of substantially constant external pressure, said crystal having parallel faces on opposite sides thereof, an electrode member in close juxtaposition to one of said faces, means rigidly clamping said electrode member against the adjacent crystal face and also clamping said crystal in electrical contact with said base portion and a circuit by which electrical forces may be impressed upon said crystal, one conductor of said circuit extending from outside said container through a conducting member to a point within said sealed enclosure on the surface of said crystal and another conductor of said circuit having an electrical connection to said base portion of said container.

7. In combination, a piezo-electric element, a hermetically sealed container surrounding said element and excluding moisture therefrom, said element having parallel electrode surfaces and means adjacent said parallel surfaces for clamping said element along said surfaces, said container having one wall which is electrically conducting and which constitutes one circuit connection to said element, and a conductor electrically connected to said element sealed through another wall of said container and constituting the return circuit connection from said element.

8. In combination, a piezo-electric element, a hermetically sealed container surrounding said element and excluding moisture therefrom, said element having parallel electrode surfaces, means adjacent said parallel surfaces for establishing electrical connections therewith, said means including one wall of said container which is electrically conducting and which constitutes one circuit connection to said element, and a conductor electrically connected to said element sealed through another wall of said container and constituting the return circuit connection from said element.

ALEXANDER M. NICOLSON.